United States Patent
Hong et al.

(10) Patent No.: US 9,866,252 B2
(45) Date of Patent: *Jan. 9, 2018

(54) MOBILE TERMINAL

(71) Applicant: LG Electronics Inc., Seoul (KR)

(72) Inventors: Sungjoon Hong, Seoul (KR); Kangjae Jung, Seoul (KR); Sungjung Rho, Seoul (KR); Youngbae Kwon, Seoul (KR); Jaewoo Lee, Seoul (KR); Deuksu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 128 days.

This patent is subject to a terminal disclaimer.

(21) Appl. No.: 14/937,621

(22) Filed: Nov. 10, 2015

(65) Prior Publication Data

US 2016/0315651 A1  Oct. 27, 2016

(30) Foreign Application Priority Data

Apr. 22, 2015 (KR) .................. 10-2015-0056845
Jul. 1, 2015 (KR) .................. 10-2015-0093901

(51) Int. Cl.
*H01Q 21/28* (2006.01)
*H01Q 9/42* (2006.01)
(Continued)

(52) U.S. Cl.
CPC ........... *H04B 1/3888* (2013.01); *H01Q 1/243* (2013.01); *H01Q 9/42* (2013.01); *H01Q 13/10* (2013.01); *H01Q 21/28* (2013.01)

(58) Field of Classification Search
CPC .......... H04B 7/00; H04B 1/1607; H04B 1/18; H04B 1/3888; H04M 1/02; H04M 1/0277; H04M 1/0202; H04M 1/026; H04M 1/0266; H04M 1/67; H04M 1/72519; H01Q 1/24; H01Q 1/243; H01Q 13/10; H01Q 21/28; H01Q 13/106; H01Q 1/521; H01Q 21/064; H01Q 9/42; H01Q 1/38; H01Q 1/245; H01Q 1/242; H04W 88/02

See application file for complete search history.

(56) References Cited

U.S. PATENT DOCUMENTS

2006/0178116 A1* 8/2006 Qi ........................... H04B 7/12
                                                                455/90.3
2010/0238079 A1  9/2010 Ayatollahi et al.
(Continued)

FOREIGN PATENT DOCUMENTS

EP           2 998 821 A1    3/2016

*Primary Examiner* — Olumide T. Ajibade Akonai
(74) *Attorney, Agent, or Firm* — Birch, Stewart, Kolasch & Birch, LLP

(57) ABSTRACT

There is disclosed a mobile terminal including a case having a display unit coupled to a front side, a first antenna mounted in the case and comprising a first slot extended in a first direction and having a closed end and an open end, a second antenna mounted in the case and comprising a second slot extended in a second direction opposite to the extended direction of the first slot and comprising a closed end and an open end, a power supply unit mounted in the case, a first feeder supplying the power of the power supply unit to the first antenna, and a second feeder supplying the power of the power supply unit to the second antenna.

9 Claims, 24 Drawing Sheets

(51) Int. Cl.
*H01Q 13/10* (2006.01)
*H04B 1/3888* (2015.01)
*H01Q 1/24* (2006.01)

(56) References Cited

U.S. PATENT DOCUMENTS

| | | | | |
|---|---|---|---|---|
| 2012/0214424 A1* | 8/2012 | Yeh | ............... | H01Q 1/2275 |
| | | | | 455/73 |
| 2012/0274532 A1 | 11/2012 | Kurashima et al. | | |
| 2013/0064149 A1* | 3/2013 | Huang | ............... | H01Q 13/10 |
| | | | | 370/297 |
| 2013/0271333 A1* | 10/2013 | Taura | ............... | H01Q 13/10 |
| | | | | 343/767 |

* cited by examiner (a)

(b)

(a)

(b)

MOBILE TERMINAL

CROSS-REFERENCE TO RELATED APPLICATIONS

This application claims priority to Korean Patent Application No. 10-2015-0056845 filed on Apr. 22, 2015 and No. 10-2015-0093901 filed on Jul. 1, 2015 in Korea, the entire contents of which is hereby incorporated by reference in its entirety.

BACKGROUND OF THE DISCLOSURE

Field of the Disclosure

Embodiments of the present disclosure relate to a mobile terminal including an antenna for transmitting and receiving a wireless communication signal.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

A conventional mobile communication system usually uses a single antenna. However, as the functions of the mobile communication system become more diversified, types of such antennas become more diversified as well. A plurality of antennas may be mounted in such a mobile communication system for various forms of wireless communication such as LTE communication for calling and data communication, short range wireless communication including, 2G and 3G communication, satellite communications, short range wireless communications including WIFI, NFC and Bluetooth, and DMB.

Such the antennas transmitting and receiving electromagnetic waves may be interfered in each other. Especially, the metallic material provided inside or outside the mobile terminal could affect signals and then it is quite important to design the antenna capable of minimizing the interference of the neighboring metallic material or antennas.

SUMMARY OF THE DISCLOSURE

An object of the present disclosure is to provide a mobile terminal which may prevent the problems mentioned above. Embodiments of the present disclosure may provide a mobile terminal including a case having a display unit coupled to a front side; a first antenna mounted in the case and comprising a first slot extended in a first direction and having a closed end and an open end; a second antenna mounted in the case and comprising a second slot extended in a second direction opposite to the extended direction of the first slot and comprising a closed end and an open end; a power supply unit mounted in the case; a first feeder supplying the power of the power supply unit to the first antenna; and a second feeder supplying the power of the power supply unit to the second antenna.

The first slot may be longer than the second slot.

The first slot may resonate with a first frequency having a wavelength corresponding to a quadruple of the length of the slot. The second slot may resonate with a second frequency having a wavelength corresponding to a quadruple of the length of the second slot.

The mobile terminal may further include a metal plate mounted in the case; a connection unit coupled to one side of the metal plate; a first conductive strip extended from the first connection unit in a first direction in a manner of being separated from the metal plate with a prescribed space; a second conductive strip extended from the connection unit in a direction opposite to the first conductive strip and positioned in a manner of being separated from the metal plate with a prescribed space, wherein the first slot is formed by the first conductive strip, the connection unit and the metal plate, and the second slot is formed by the second conductive strip, the connection unit and the metal plate.

The metal plate is provided in a rear surface of the display unit and it configurates a predetermined portion of a middle frame for supporting the display unit. The middle frame may further include an injection mold integrally formed with circumferences of the metal plate, the first conductive strip and the second conductive strip, in the manner of insert-molding.

The mobile terminal may further include a main board provided in a rear surface of the metal plate; and an external terminal connection unit coupled to a rear surface of the main board, wherein at least one of the first and second conductive strips is provided in a direction to the rear surface of the external terminal connection unit.

The first conductive strip and the second conductive strip may use the metallic deco exposed to the case of the mobile terminal. The first conductive strip and the second conductive strip are strip substrates having a metallic material. The connection unit may include a screw connecting the strip substrates and the metal frame to each other.

The mobile terminal may further include a stub connectedly extended from at least one of the other ends of the first and second conductive strips.

The stub may be arranged on a plane different from the first conductive strip or the second conductive strip.

The case may include a front case covering the front surface; and a rear cover covering the rear surface, and the stub is formed in a rear surface of the rear case and connected to at least one of the first and second conductive strips through the rear case.

The first conductive strip and the second conductive strip may be provided in an upper or lower portion of the case, and the stub may be vertically extended along a lateral surface of the case.

The stub may be spaced apart a preset distance from the metal plate. The first slot and the second slot may be extended corresponding to the length of the stub.

The first feeder may include a delay line extended along the first conductive strip, and the first feeder is connected to the first conductive strip at one end of the delay line.

The mobile terminal may further include a switch disposed between the delay line and the first conductive strip and selectively connecting the first conductive strip to a plurality of matching circuits.

The mobile terminal may further include a switch selectively connecting the first conductive strip to a plurality of matching circuits, separate from the first feeder.

The first antenna may resonate a third frequency having a wavelength corresponding to a quadruple of the length of the delay line.

The mobile terminal may further include a first branch pattern comprising one end connected to the first conductive strip and the other end extended in a direction to the end extended in a second direction; and a second branch pattern provided adjacent to the first antenna and comprising one end connected to the power supply unit and the other end extended in a first direction, wherein the other end of the first branch pattern and the other end of the second branch pattern are arranged nearby, facing each other.

The first antenna may resonate with a fourth frequency having a wavelength corresponding to a quadruple of the length of the first branch pattern or a fifth frequency having a wavelength corresponding to a quadruple of the length of the second branch pattern.

The first feeder may be connected to the first strip and the second feeder may be connected to the second strip.

The mobile terminal may further include a third branch pattern extended from the second conductive strip; and a fourth branch pattern provided adjacent to the second antenna and comprising one end connected to the power supply unit.

Embodiment of the present disclosure may also provide a mobile terminal including a case; a metal plate mounted in the case; a first radiator comprising one end connected to the metal plate via a connection unit and extended from the connection unit in a first direction, spaced apart a preset distance from the metal plate; a first feeder connected to the first radiator and supplying power; an additional radiator; and a first switch switched on and off to connect the additional radiator and the first feeder to each other.

The additional radiator may include one end having a first branch pattern connected to the first radiator.

The first switch may have a variable position connected to the first branch pattern.

A signal may resonate with a first frequency having a wavelength corresponding to a quadruple of the length of the connection unit and the first feeder, when the first switch is switched off. The connection unit, the first feeder, and the first branch pattern may form a loop and electric currents flow along the loop formed, when the first switch is switched on, and a signal may resonates with a second frequency having a wavelength corresponding to a double of the length of the loop.

The mobile terminal may further include a second branch pattern extended in a first direction and comprising one end connected to the power supply unit, wherein the first branch pattern is extended in a second direction opposite to the first direction and the other end of the first branch pattern and the other end of the second branch pattern are arranged nearby, facing each other.

The first radiator may resonate with a first frequency having a wavelength corresponding to a quadruple of the length of the first branch pattern or a fourth frequency having a wavelength corresponding to a quadruple of the length of the second branch pattern.

The additional radiator may include a third radiator provided in a position different from the first radiator, spaced apart a preset distance from the metal plate, and comprising one end connected to the metal plate; and a controller switching on the first switch to be connected to the third radiator, when signal transmitting/receiving efficiency via the first radiator is a reference value or less.

The mobile terminal may further include a second switch switching on and off the connection between the first feeder and the first radiator, wherein the controller switches on the second switch when the first switch is switched off, and the controller switches off the second switch when the first switch is switched on.

The first radiator may be a lateral side metal case provided in a lateral surface of the case, and The third radiator is provided in a front surface of the case or in the case, and the controller may switch on the first switch when a user touches the lateral side metal case.

The mobile terminal may further include a second radiator extended in a direction opposite to the first radiator comprising one end connected to the connection unit; and a second feeder supplying power to the second radiator.

The second radiator may be shorter than the first radiator.

The first feeder may include a power supply line connected to a power supply source; a delay line extended in a direction equal to the extension direction of the first radiator; and a supply line connected to the first radiator.

The first switch may be connected to the delay line.

The first radiator may resonate with a third frequency having a wavelength corresponding to a quadruple of the delay line.

The mobile terminal may further include an injection mold filled between the metal plate and the first radiator.

The first radiator may be arranged an outer surface of the mobile terminal;

A predetermined portion of the first radiator may be arranged in the mobile terminal and another predetermined portion may be exposed outside the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Figure 1A:
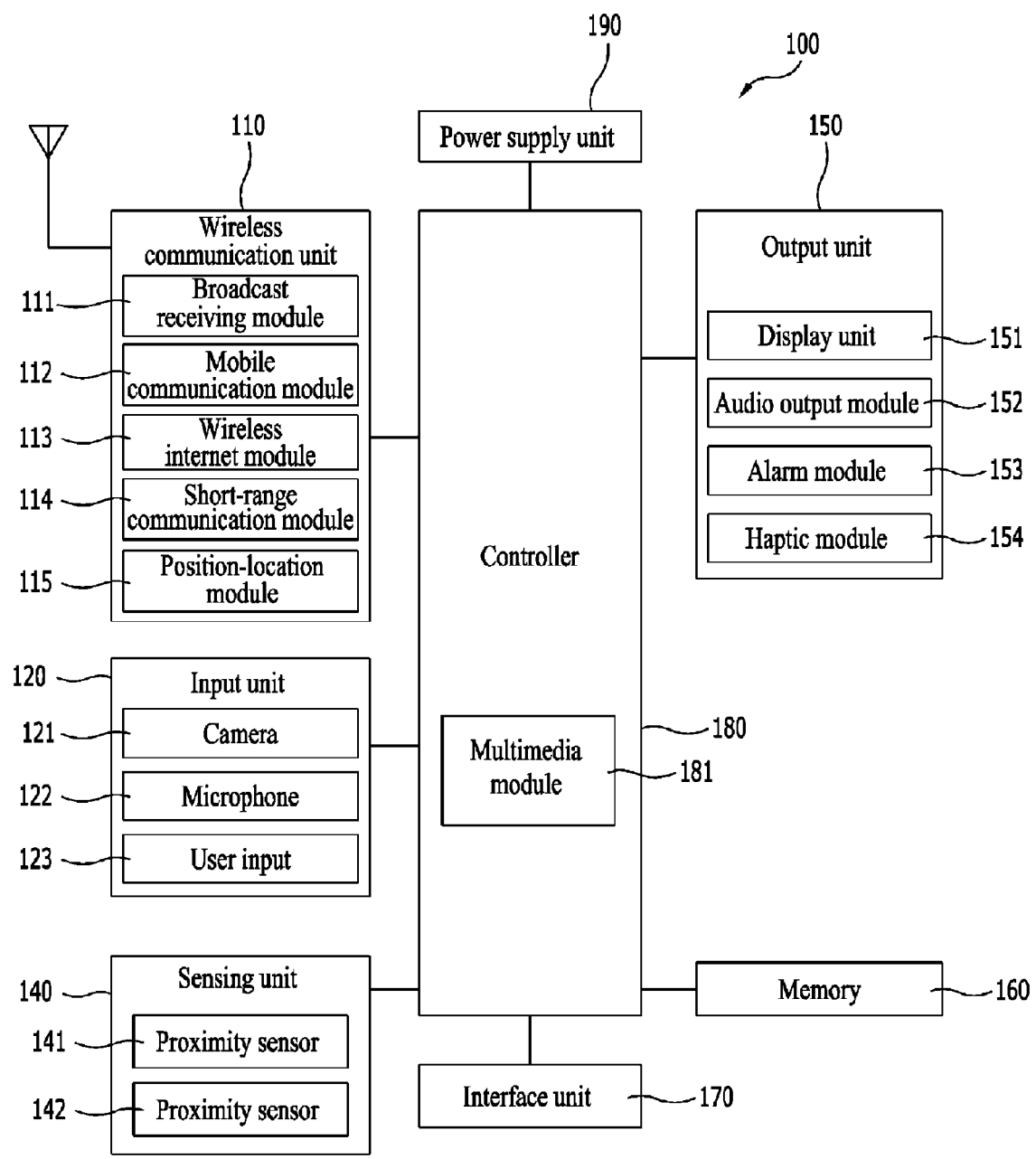
FIG. 1A is a block diagram to describe a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
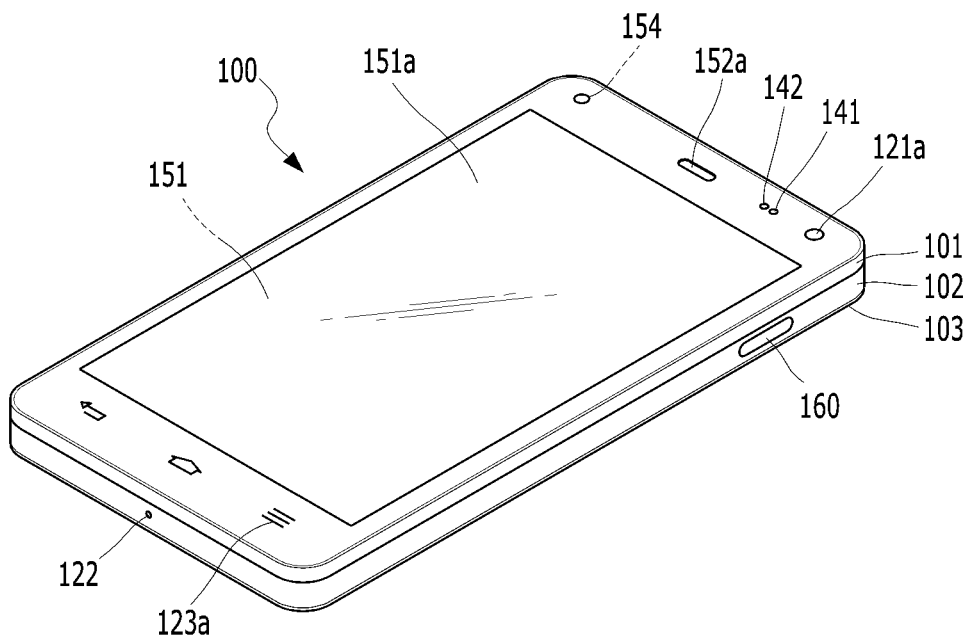
FIGS. 1B and 1C are conceptual diagrams of one example of the mobile terminal, viewed from different sides.
Figure 1C:
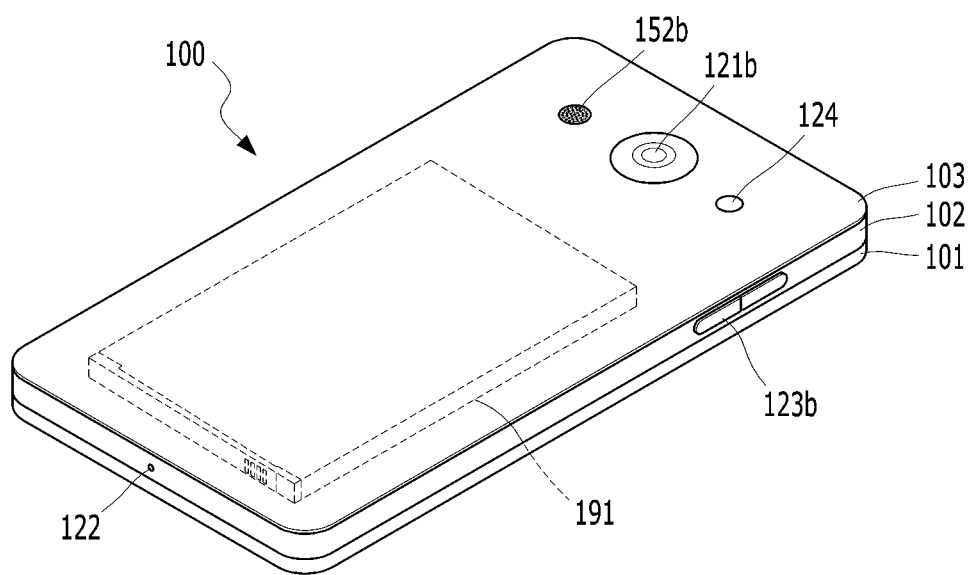

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. It is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

Figure 2:
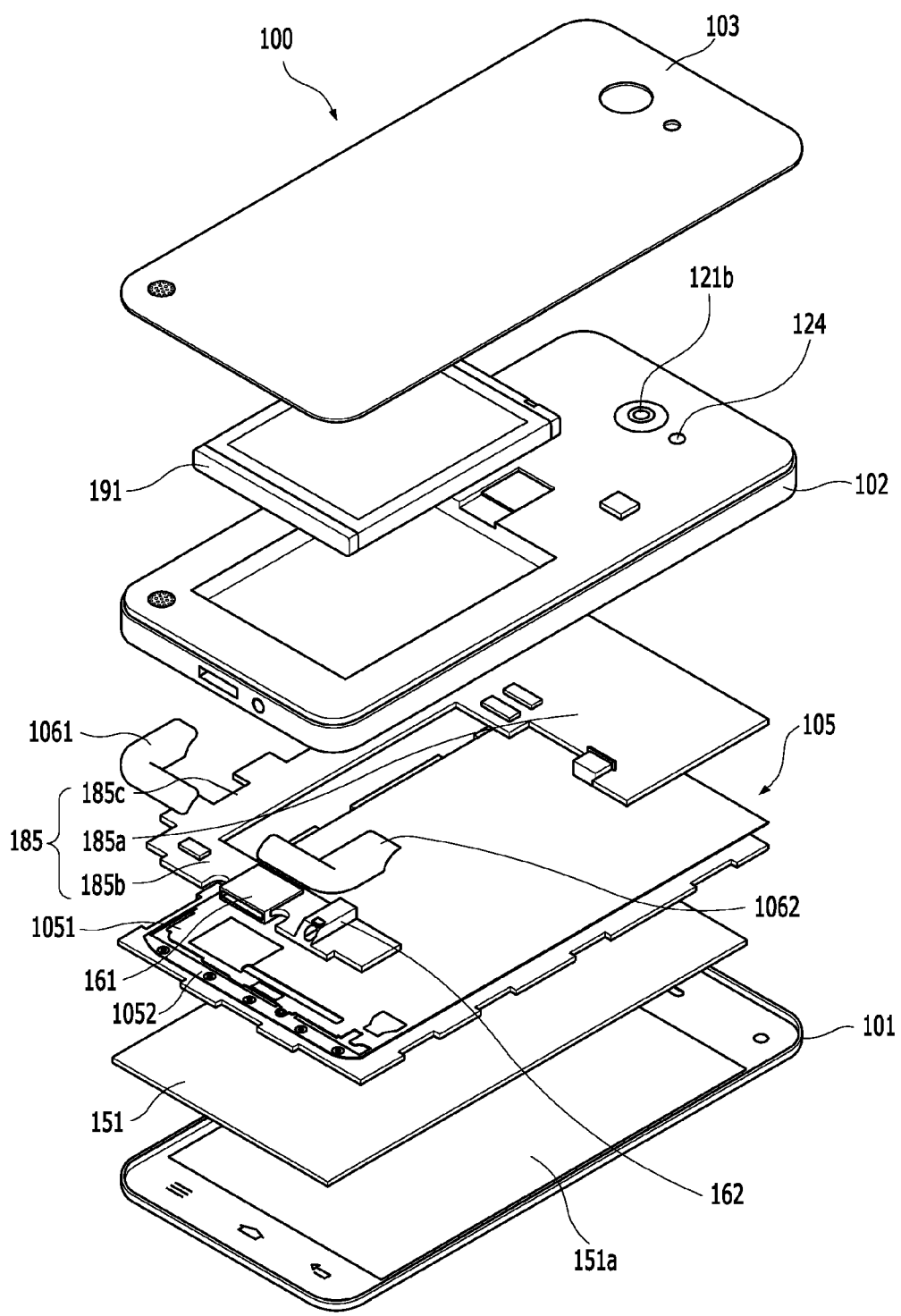
FIG. 2 is an exploded perspective diagram illustrating one example of the mobile terminal in accordance with the present disclosure.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen FIG. 2 is an exploded perspective diagram for an example of a mobile terminal 100 according to the present invention. Referring to FIG. 2, the mobile terminal 100 includes the display unit 151 and a window 151a situating at the front side of the display unit 151. Since an edge part of the window 151a is combined with an edge of the front case 101, it may be able to fix the display unit 151.

In order to support the display unit 151, install electronic elements and provide hardness to the mobile terminal 100, a middle frame 105 can be interposed between the front case 101 and a rear case 102. The display unit 151 is positioned at the front of the middle frame 105. A camera 121a, an audio output module 152a, a user input unit 131a and the like are arranged at an edge of a front side of the middle frame 105.

A battery mounting unit on which a main board 185 and a battery are mounted is installed in a rear side of the middle frame 105. An antenna for wireless communication, a USB port 161 for connecting an external device, an interface 160 such as an ear jack 162 and the like can be arranged at the rear side of the middle frame 105.

The middle frame 105 forms a first frame 1051 using such a metallic material as magnesium for hardness and a second frame 1055 is formed in a manner of covering an edge of the first frame 1051 with resins, which is an electric insulation material, via insert injection. The first frame 1051 provides hardness to the mobile terminal 100 and functions as a ground in a manner of being connected with such an electronic part as the main board 185 and an antenna.

Since the second frame 1055 is formed using injection molding, shape degree of freedom is high compared to the first frame 1051 made of a metal. In case of a member capable of easily forming a bump and not contacted with the first frame 1051 electrically, the member can be installed in the second frame 1055.

A main board 185 and a battery 191 are arranged at the rear side of the middle frame 105. Since the battery 191 is thicker than any other member, the main board 185, an interface unit, a card slot in which a USIM card or a memory card is installed, a camera of a rear side, an audio output module of the rear side and the like can be arranged in a manner of avoiding a part in which the batter 191 is installed to minimize overlap of the battery 191 and a different member.

In order to electrically connect a part arranged at an upper side with a part arranged at a bottom part on the basis of the battery 191, it may be able to configure a first main board 185*a* arranged at the upper side, a second main board 185*b* arranged at the bottom side and a connection board 185*c* connecting the first main board 185*a* and the second main board 185*b* with each other. Since the connection board 185*c* corresponds to a signal connection path between the two boards and is not designed to install a different part in the connection board, the connection board can be made up of a flexible printed circuit board of which bearing power is not strong.

An integrated circuit (IC) for various operations, which includes an AL (application processor) chip driving the mobile terminal 100, is installed in the first main board 185*a* arranged at the upper part. And, a camera, a rear side input unit and the like can also be arranged at the first main board. Such an interface as a USB port 161 and an ear jack 162, a speaker and the like can be arranged at the bottom part.

Antennas for wireless communication are arranged at an upper part and a bottom part of the mobile terminal 100. As a function of the mobile terminal 100 is diversifying, various forms of an antenna can be used. Hence, antennas can be installed in the upper part and the bottom part of the mobile terminal. Since a frequency band transmitted and received by each antenna and a scheme of each antenna is different from each other, each antenna operates independently. Yet, since each antenna emits an electromagnetic wave, there exists a problem of interference interfering with each other.

If interference occurs, a transmission and reception rate of a radio signal is reduced sharply. Hence, it is preferable to arrange antennas in a manner of being separated from each other. And, since a side of the mobile terminal corresponds to a part held by a user when the mobile terminal is in use, a transmission and reception rate of a radio signal may be reduced by a hand of the user. Hence, antennas can be arranged at the upper part and the bottom part of the mobile terminal in a manner of being distributed.

An antenna used for the mobile terminal 100 can be variously used for a phone call and data communication. A main antenna configured to perform wireless communication with a base station of the mobile terminal 100 should be able to perform wireless communication using various communication schemes such as 2G, 3G and LTE of various bands.

The main antenna can be positioned at one side (bottom side in the present embodiment) of the mobile terminal 100 and a sub antenna can be positioned at another side of the mobile terminal 100 to supplement a function of the main antenna. And, it is necessary to have an antenna for short-range wireless communication such as Bluetooth and WIFI and a GPS antenna for communication between a GPS (global positioning system) and a satellite is also installed in the mobile terminal.

Each antenna is different from each other according to a wireless communication scheme. In particular, wireless communication communicated with a base station of a communication company, which is in charge of the main antenna and the sub antenna, transmits and receives a signal according to a regulation different from each other depending on a communication company or a country. Moreover, one communication company transmits and receives a signal via various frequency bands. If wireless communication does not work on a specific frequency band according to a region or a situation, in order to enable the wireless communication to be performed on a different frequency, a broadband antenna is used to enable a signal to be transmitted and received on a broadband frequency.

Yet, as a size of the mobile terminal 100 has been reduced and a distance between parts has decreased, an impact caused by a part in the vicinity of an antenna increases.

Hence, the mobile terminal according to the present invention intends to minimize an impact from a surrounding device using a slot antenna. The slot antenna corresponds to an antenna capable of performing wireless communication in a manner that electricity is provided to a conductor in which a long and thin opening is formed and a radio wave is emitted from the opening by an electric current spread on a surface of the conductor.

A general slot antenna operates as an radiator of a radio wave in a manner that a slot is formed on a wall of a wave guide, a surface of a conductor of a cylinder form or a plane conductor plate and electricity is provided to a part in which the slot is formed to make an electric field to be formed in the slot. The slot antenna should have a length of minimum $\lambda/2$ of a transmitting and receiving frequency and there is a limit on reducing a slot length. If an open slot antenna of which one side is opened is used in a manner of improving a closed antenna of which both sides are closed, a slot length (D) becomes a length sufficient enough to use by a length of $\lambda/4$. By doing so, a size of an antenna slot can be reduced to a half.

Figure 3:
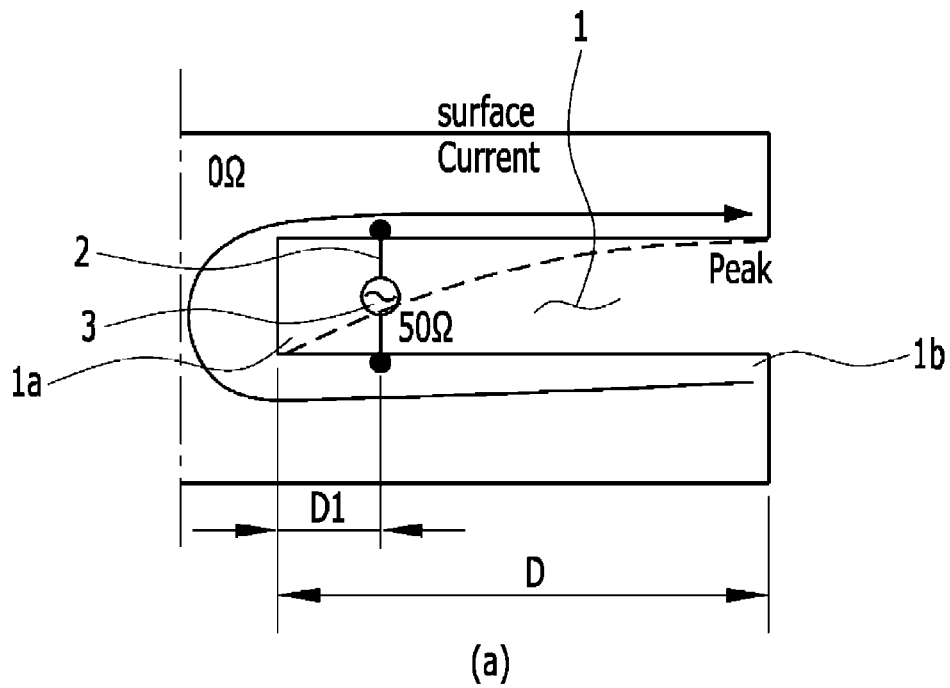
FIG. 3 is a diagram to describe a slot antenna of the mobile terminal in accordance with the present disclosure.
Figure 3:
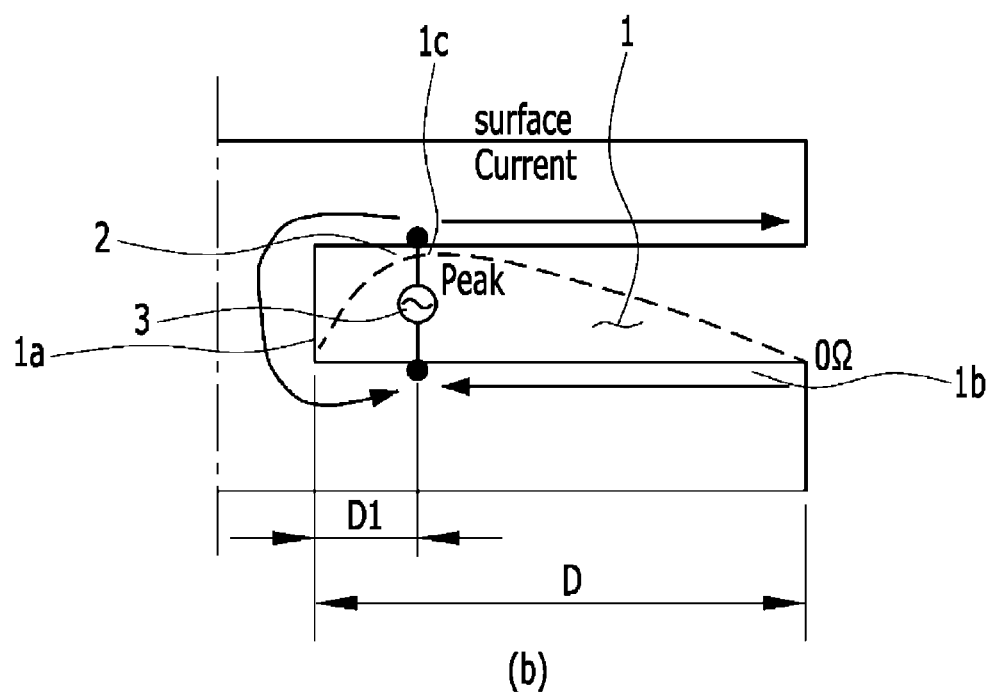

FIG. 3 is a conceptual diagram for explaining a general slot antenna. FIG. 3 (*a*) shows a relation between impedance and an electric current in case that a slot antenna of which one side is opened emits a radio wave of a first frequency band. In this case, a feeder 2 providing electricity is connected with the slot antenna at a D1 distance from a closed part 1*a* of the slot 1.

A dotted line indicates a size of the impedance and an arrow indicates an electric current flowing along the slot 1. A length of the slot 1 has a length corresponding to $\lambda/4$ of a center frequency wavelength of a first frequency band.

A signal is resonating through the case of the mobile terminal and the signal could have a different permittivity according to the material of the case. Accordingly, a guided wavelength is used as a criterion for the wavelength of the resonance frequency. The guided wavelength refers to the electromagnetic wavelength in a dielectric substance and it can be gained from a ratio of the wavelength to the permittivity of the air. The permittivity of the case is larger than the permittivity of the air so that the guided wavelength may be smaller than the wavelength of the air.

To receive a signal having a wavelength corresponding to the quadruple of the slot length in a ¼ wavelength frequency band, impedance matching is performed and the maximum impedance is gained at an open end 1*b* of the slot 1.

If impedance of the feeder 2 connected with a power feeding unit 3 is configured by a prescribed value (e.g., 50Ω) and a position (D1) of the feeder 2 connected with the slot 1 is adjusted, it is able to control the maximum impedance to be outputted from the end of the slot. This is called impedance matching.

If case of performing the impedance matching, a transmission and reception rate of a signal of a specific frequency band is rapidly enhanced compared to a different frequency band. In this case, a specific frequency of which a reception rate is high is called a resonant frequency.

FIG. 3 (*b*) shows a relation between impedance and an electric current in case that the slot antenna shown in FIG. 3 (*a*) emits a radio wave in a second frequency band. In this case, a length of the slot 1 has a length corresponding to λ/2 of a center frequency wavelength of the second frequency band. In particular, a wavelength of the second frequency band corresponds to a high frequency band (high band) of which the wavelength is shorter than a wavelength of the first frequency band and the first frequency band corresponds to a low frequency band (low band) of which a wavelength is relatively long.

Since λ/4 point of a wavelength is positioned at a center part of a slot 1 instead of an end of the slot 1, an impedance maximum value is formed at the center part of the slot 1. Hence, about 300Ω impedance appears at a part at which a feeder 211/212/215 is positioned and the impedance is not matched with impedance of the feeder 211/212/215. Hence, it may have a problem that an antenna reception rate of a high frequency band is degraded.

For this reason, a slot antenna has been mainly used for processing a radio signal of a single frequency band and it has been difficult to process radio signals of a plurality of frequency bands. A mobile communication provide a service using frequency bands including 800 MHz, 900 MHz, 1.8 GHz, 2.1 GHz and 2.6 GHz. A frequency band used for providing a service is little bit different from each other depending on a communication company and a different frequency band can be used according to a country.

In order to provide a mobile terminal capable of being applied to various communication companies and the mobile terminal usable in abroad, it is necessary to have an antenna usable for mobile communication services provided by various frequency bands. Hence, it is difficult to apply a slot antenna.

Figure 4:
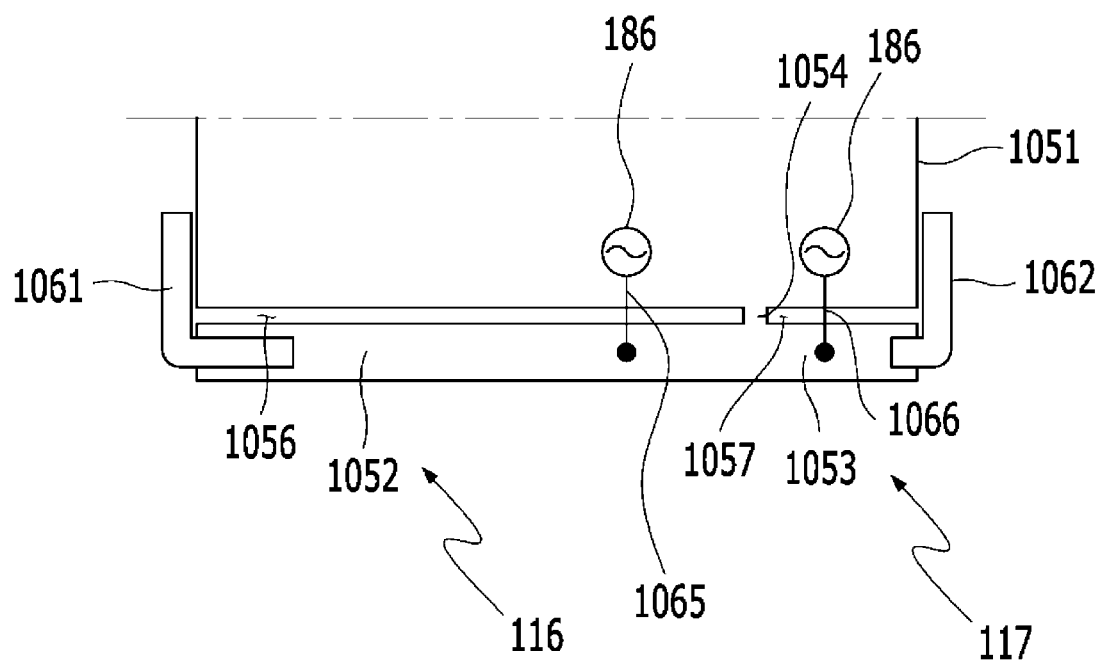
FIG. 4 is a conceptual diagram illustrating a schematic structure of an antennal provided in the mobile terminal in accordance with the present disclosure.

FIG. 4 is a conceptual diagram for a schematic configuration of an antenna of a mobile terminal 100 according to the present invention. In order to solve the aforementioned problem and improve performance of an antenna, an antenna can be configured by two slots 1056/1057 transmitting and receiving signals in a manner of dividing the signals into a signal of a low frequency bandwidth (low band) and a signal of a middle frequency bandwidth (Mid band).

Referring to FIG. 4, FIG. 4 shows a metal plate 1051, a first conductive strip 1052, a second conductive strip 1053, a connection unit 1054, a first feeder 1065, a second feeder 1066, a first stub 1061 and a second stub 1062.

A slot antenna according to the present invention consists of a first antenna 116 including a first slot 1056 formed by a metal plate 1051, a connection unit 1054 and a first conductive strip 1052 and a second antenna 117 including a second slot 1057 formed by the metal plate 1051, the connection unit 1054 and a second conductive strip 1053 in a manner of being surrounded.

Since the first slot 1056 and the second slot 1057 are opened to a direction opposite to each other, respectively, an emitting direction is different from each other and mutual interference is less. If the two slots are formed in a manner of being different from each other in length, the two slots can be respectively used for wireless communication of frequencies different from each other. The first slot 1056 of a longer length emits a signal of a low frequency bandwidth (low band) and the second slot 1057 of a shorter length emits a signal of a middle frequency bandwidth (Mid band).

Since a mobile terminal 100 is restricted in size, a size of a conductive strip 1052 is restricted as well. Hence, since a length of the first slot 1056, which is formed by the metal plate 1051, the connection unit 1054 and the first conductive strip 1052, is restricted, it may further include a first stub 1061 configured to extend the first slot 1056 to cause resonance with a frequency intended to be emitted by the first slot 1056.

Similar to the first slot 1056, the second slot 1057 emitting a signal of a high frequency bandwidth can also include a second stub 1062 to sufficiently secure a slot length of a slot antenna causing resonance in the high frequency bandwidth.

The first stub 1061 and the second stub 1062 are further provided, so that the first antenna 161 and the second antenna 117 may have the characteristics of a slot antenna as well as characteristics of a PIF antenna (Planar Inverted-F antenna).

Even though not integrally formed as one body, the first conductive strip 1052 and the first stub 1061 are electrically connected and they form a first radiator for emitting a signal at a low frequency band (or Low band). The second conductive strip 1053 and the second stub 1062 form a second radiator for emitting a signal at a middle frequency band (or Mid band).

Figure 5:
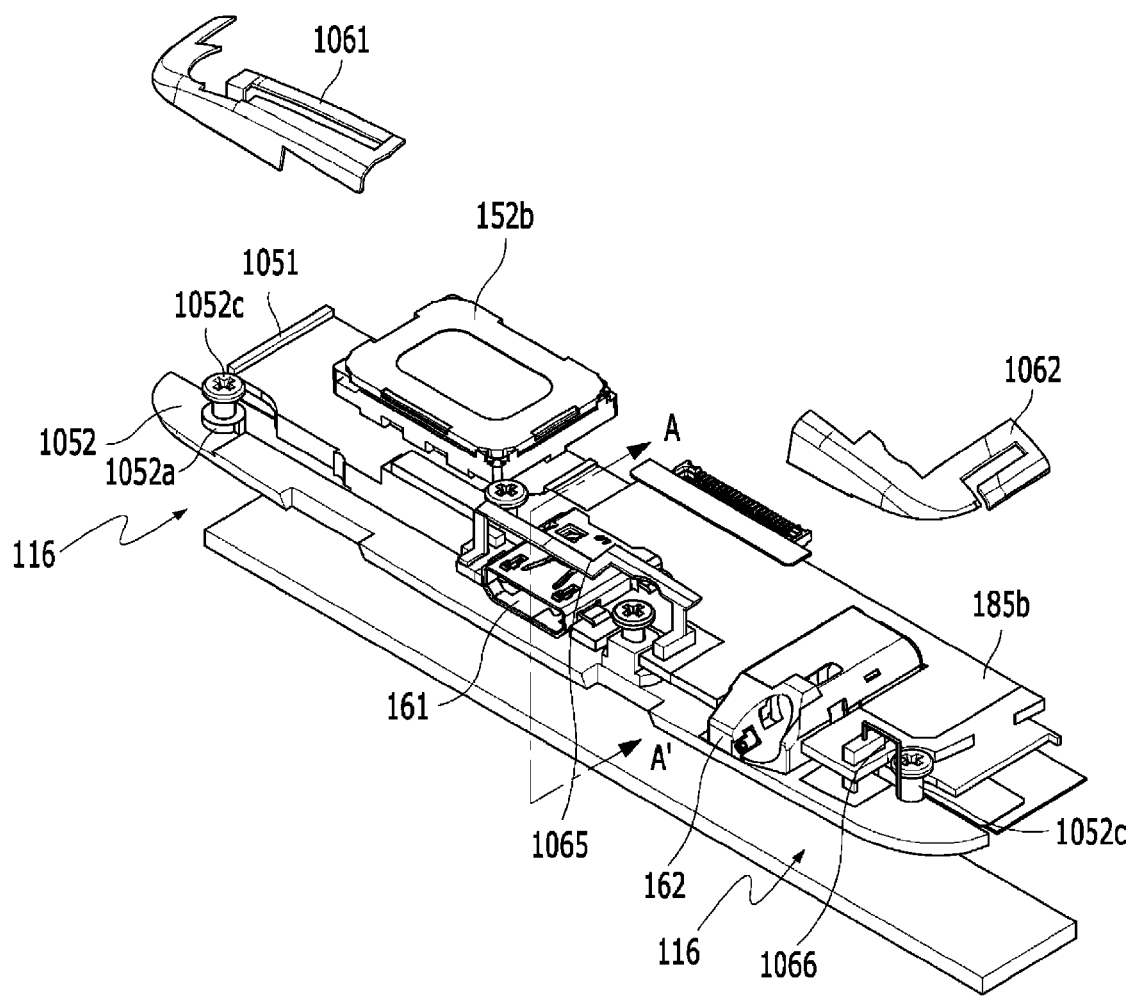
FIG. 5 is a perspective diagram illustrating one example of a state where a middle frame and a main board are coupled to each other in the mobile terminal in accordance with the present disclosure.

In the following, the present invention is explained with reference to detail embodiments of FIG. 5 to FIG. 8. FIG. 5 is a perspective diagram for an example of a state that a middle frame 105 and a main board of a mobile terminal 100 are combined with each other according to the present invention. In the present embodiment, a metal plate 1051 is positioned at a rear side of a display unit 151 and may be able to use a first frame of a middle frame 105 supporting parts installed in the display unit 151 and the mobile terminal 100. Besides the middle frame 105, if a case made up of a metallic material is applied, the case may become the metal plate 1051.

According to the present embodiment, the first conductive strip 1052 and the second conductive strip 1053 are integrated with each other on the middle frame 105. In particular, the first conductive strip 1052 and the second conductive strip 1053 are arranged at one end of the metal plate 1051 in a manner of being connected with each other side-by-side and it may be able to include a connection unit 1054 connecting the metal plate 1051, the first conductive strip 1052 and the second conductive strip 1053 with each other.

If the first conductive strip 1052 and the second conductive strip 1053 are connected with the metal plate 1051 via the connection unit 1054 only, the connection connected by the connection unit 1054 may be disconnected. In order to prevent the connection unit from being disconnected, the first slot 1056 and the second slot 1057 can be filled with injected material in case of forming the middle frame 105.

Since the injected material is made of non-conductive material, it is able to prevent the first conductive strip 1052 and the second conductive strip 1053 from being separated from the metal plate 1051 while a function of the slot antenna is maintained.

A main board 185 is mounted on a rear side of the middle frame 105. As mentioned in the foregoing description, the main board 185 consists of a first main board 185a positioned at an upper part of the mobile terminal 100, a second main board 185b positioned at a bottom part of the mobile terminal on the basis of a position in which a battery 191 is installed, and a connection board 185c positioned between the first main board 185a and the second main board 185b. FIG. 5 shows the second main board 185b positioned at the bottom part of the mobile terminal.

The second main board 185b is connected with a power supply unit via a feeder 1065/1066 to receive power and may be able to emit a signal in a manner of making an electric current flow in the antenna. One end of the first feeder 1065 supplying power to the first slot 1056 is connected to the second main board 185*b* and another end of the first feeder is connected to the first conductive strip 1052. One end of the second feeder 1066 supplying power to the second slot 1057 is connected to the second main board 185*b* and another end of the second feeder is connected to the second conductive strip 1053.

Impedance of supplied power can be controlled by controlling a length of the feeder 1065/1066. A signal emitted by the first slot 1056 and a signal emitted by the second slot 1057 can be matched with each other by controlling a position to which the conductive strip is connected. The feeder 1065/1066 can further include a capacitor to perform impedance matching. As shown in FIG. 5, in order to secure a prescribed length, the feeder 1065/1066 can be arranged in a manner of passing over a USB port 161 or an ear jack 162.

Such an interface as an ear jack 162, a USB port 161 and the like, a speaker and the like can be positioned at the bottom part of the mobile terminal 100. A signal can be received and transmitted in a manner that the ear jack 162 or the USB port 161 is connected with the second main board 185*b*.

The ear jack 162 includes a hole to which an earphone plug is inserted to transmit an audio signal in order to output sound via such sound equipment as an earphone and a headphone. The ear jack 162 can be positioned at the upper part or a bottom part of the mobile terminal 100. The present embodiment shows that the ear jack is positioned at the bottom part of the mobile terminal.

The USB port 161 is connected with such an external device as a computer, transmits and receives data in wire, and receives power in a manner of being connected with an external power supply. The USB port 161 and the ear jack 162 include a hole to connect with an external device and the hole is formed on a side of a main body. Hence, it is difficult to make a contiguous member to be positioned at a part at which the ear jack 162 or the USB port 161 is positioned. Since the part to which the ear jack 162 or the USB port 161 is positioned corresponds to a path in which power flows or the path in which a signal is moving, the part affects a surrounding electromagnetic field.

Hence, an antenna positioned at the bottom part of the mobile terminal 100 is generally positioned at a side of the position at which the USB port 161 or the ear jack 162 is formed. In case of an antenna including a pattern of being bent multiple times such as a PIFA (planar inverted F antenna), the antenna is arranged in a manner of being bent in a narrow space of the left and the right of the USB port 161 or the ear jack 162 to avoid the USB port 161 or the ear jack 162.

On the contrary, as mentioned in the foregoing description, unlike a different antenna, since a slot antenna is less affected by surrounding, the slot antenna can be arranged in the vicinity of the ear jack 162 and the USB port 161. Hence, as shown in FIG. 5, the ear jack 162 and the USB port 161 can be mounted on a rear side of the middle frame 105.

It may be able to form a boss to which a screw is inserted when the first conductive strip 1052 and the second conductive strip 1053 are combined with a case of the mobile terminal 100. If the boss is formed on a part of the metal plate 1051 of the middle frame 105, a mounting space may be restricted by the boss. Yet, if a position of the boss is located at an outermost of the mobile terminal 100, utilization of an internal space can be enhanced. For instance, if the boss is moved to an end part of the mobile terminal, a resonance space of a speaker, which is positioned at the bottom part of a rear side of the mobile terminal, can be secured.

A stub 1061/1062, which is combined with an end part of the first conductive strip 1052 and an end part of the second conductive strip 1053, is made up of a conductive material and is arranged in a manner of being separated from the metal frame with a prescribed distance. As shown in FIG. 5, the end part can be extended in a manner of being bent in a vertical direction. The stub 1061/1062 can emit a signal of a preferred wavelength in a manner of actually extending a length of a slot.

The stub 1061/1062 can be installed in the inside of a rear case to make the conductive strip to be connected with the rear case when the rear case is combined. In this case, a shape of the stub 1061/1062 is similar to a shape of the rear case.

Figure 6:
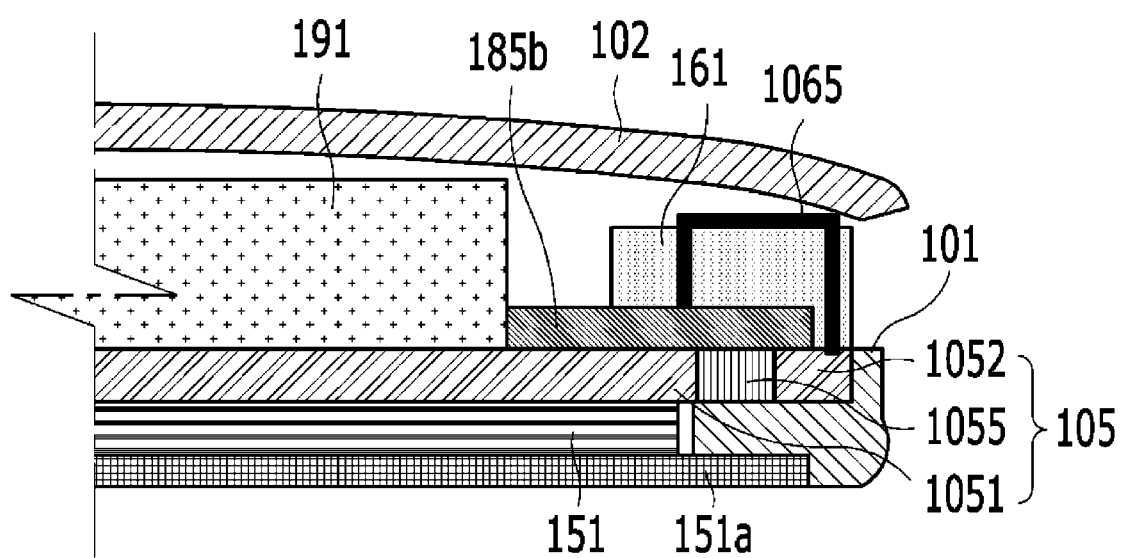
FIG. 6 is a sectional diagram illustrating one example of the mobile terminal in accordance with the present disclosure.

FIG. 6 is a cross-section diagram of the aforementioned embodiment. A metal plate 1051 and a conductive strip are installed in a rear side of a front case with which a display unit 151 is combined. A slot, which is formed between the metal plate 1051 and the conductive strip, is combined with a middle frame in a manner of injecting an injected material 1055 into the slot.

A second main board 185*b* and a USB port 161 are mounted on a rear side of the middle frame 105 and a feeder 1065/1066 providing power to a conductive strip is positioned between the conductive strip and the second main board 185*b*.

A rear case can be combined in a manner of covering a battery 191 mounted on the second main board 185*b* and a rear side of the middle frame 105. In case of a removable battery 191, the battery 191 is mounted on a rear side of the rear case after the rear case is combined and a rear cover can be combined with the rear side of the rear case.

Figure 7:
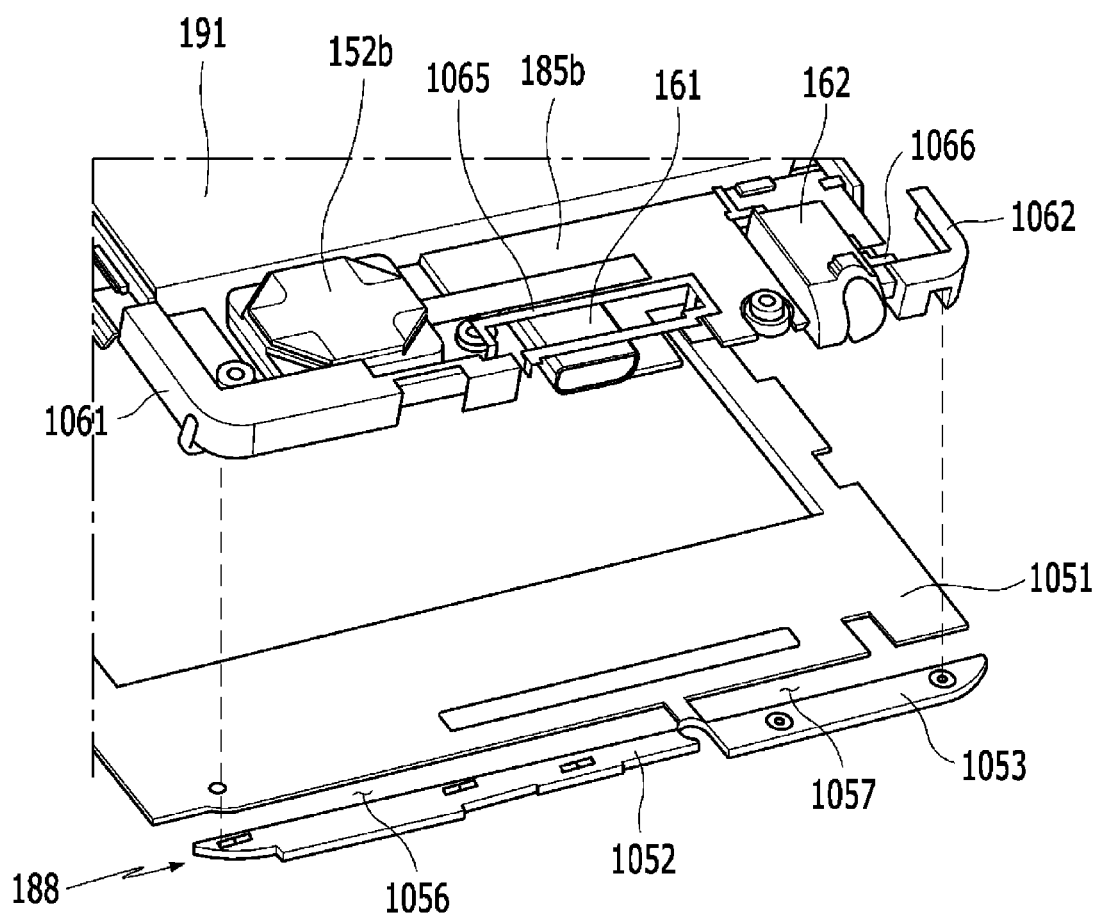
FIG. 7 is a perspective view illustrating another example of the antenna provided in the mobile terminal in accordance with the present disclosure.

FIG. 7 is a diagram for a different example of an antenna of a mobile terminal according to the present invention. A conductive strip and a middle frame 105 are not integrated with each other and the conductive strip can be implemented by a strip board 188 including a conductive material.

The strip board 188 can be implemented using a hard printed circuit board or a flexible printed circuit board. In this case, the strip board 188 can be positioned at a rear side of the USB port 161 or the ear jack 162 in a manner of partly bending the strip board.

Although the strip board 188 is connected with a metallic member constructing an exterior of the mobile terminal 100, the strip board does not affect emitting performance of an antenna. Hence, the strip board has less restriction on forming the exterior of the mobile terminal using the metallic member.

Figure 8:
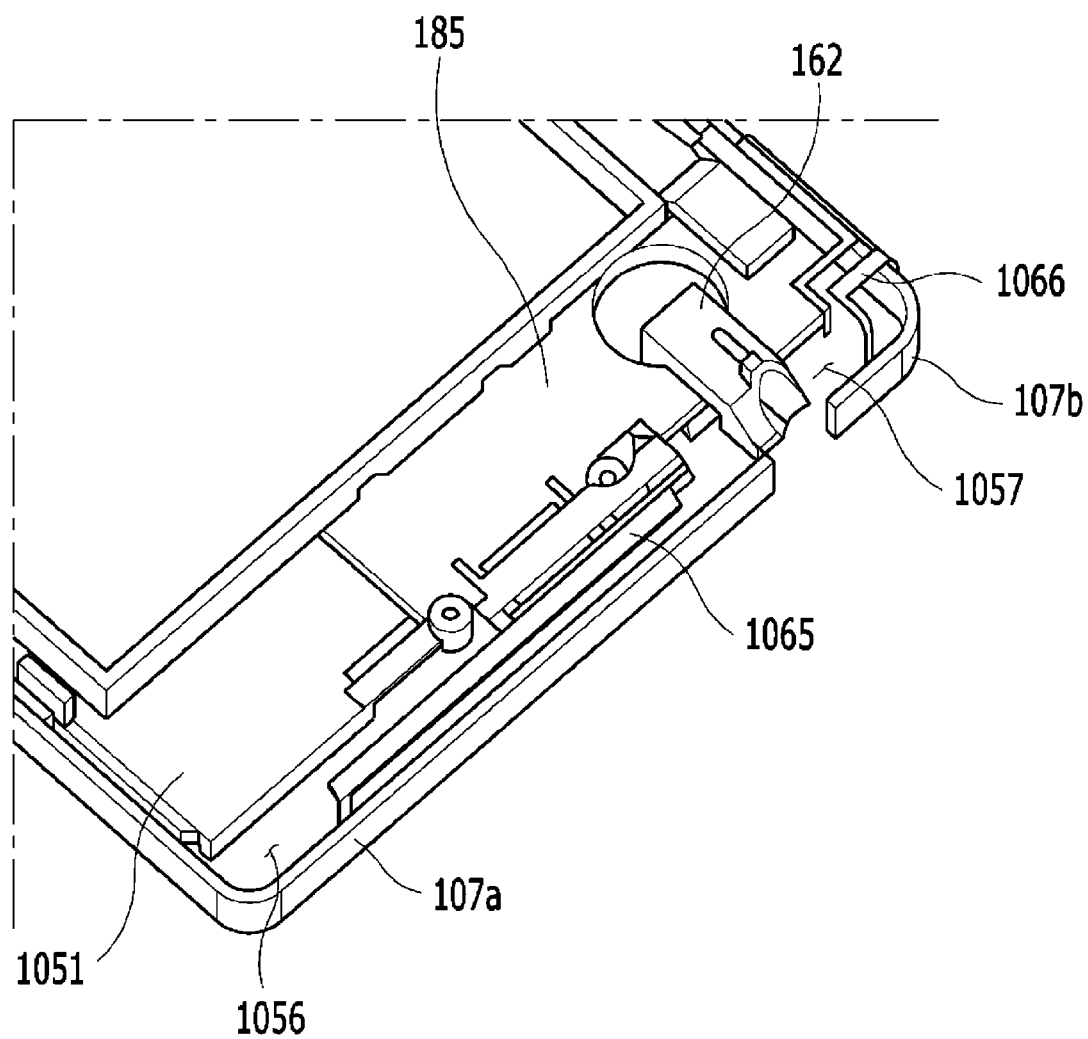
FIG. 8 is a perspective diagram illustrating a further example of the antenna provided in the mobile terminal in accordance with the present disclosure.

FIG. 8 is a diagram for a further different example of an antenna of a mobile terminal according to the present invention. A slot antenna can be implemented using a metal deco 107*a*/107*b* constructing a part of a case as a conductive strip. It may be able to use a front side metal deco constructing a part of front exterior or a metal deco 107*a*/107*b* positioned at a side edge shown in FIG. 8.

In case of using a metal deco 107*a*/107*b* constructing a part of a case as a conductive strip, the metal deco 107*a*/107*b* is connected with a metal plate 1051 of the middle frame 105 and receives power in a manner of being connected with the second main board 185*b*.

As shown in FIG. 8, in order to secure a space to which an ear jack 162 or a USB port 161 is inserted, the metal deco 107*a*/107*b* can be divided into a first conductive strip 107*a* and a second conductive strip 107*b*. In this case, each of the first conductive strip 107*a* and the second conductive strip 107*b* can be electrically connected with the metal plate 1051.

Since the conductive strip 107*a*/107*b* is able to be extended to a side of the mobile terminal 100, unlike what is mentioned earlier in the embodiment, it is able to sufficiently secure a length of a slot. Hence, it is able to implement a slot of a sufficient length without a separate stub.

Figure 9:
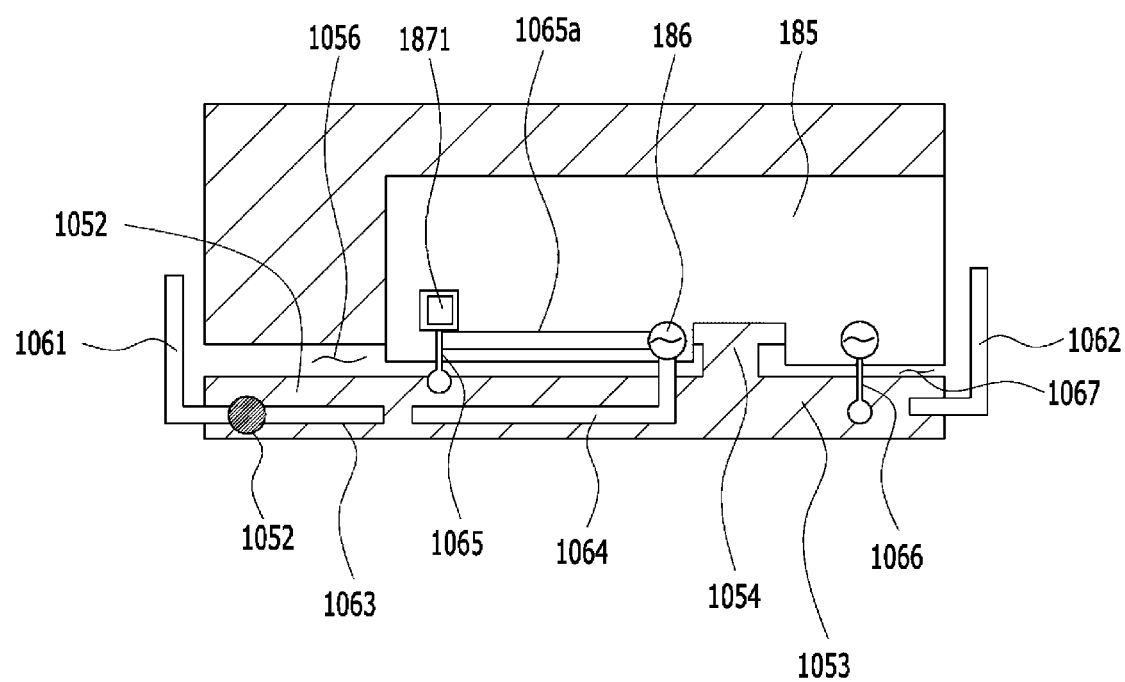
FIG. 9 is a plane view illustrating one example of a first antenna provided in the mobile terminal in accordance with the present disclosure.
Figure 10:
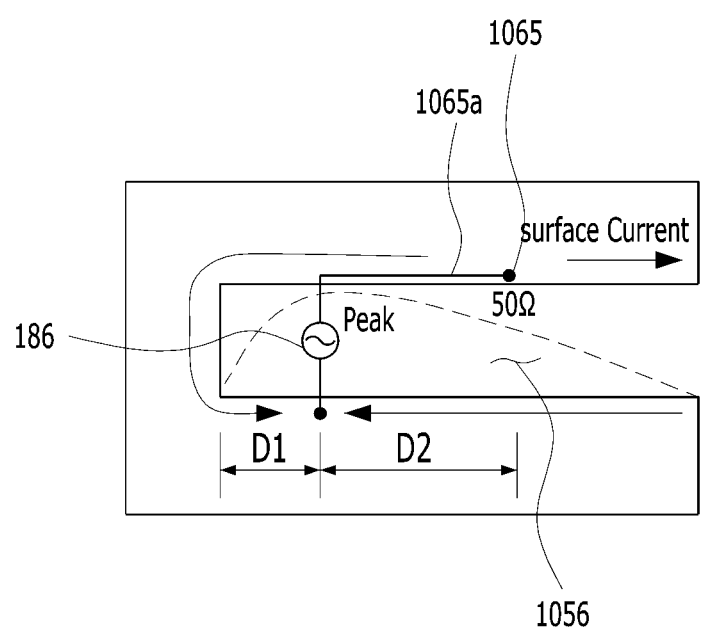
FIG. 10 is a diagram illustrating another example of the first antenna shown in FIG. 9.
Figure 11:
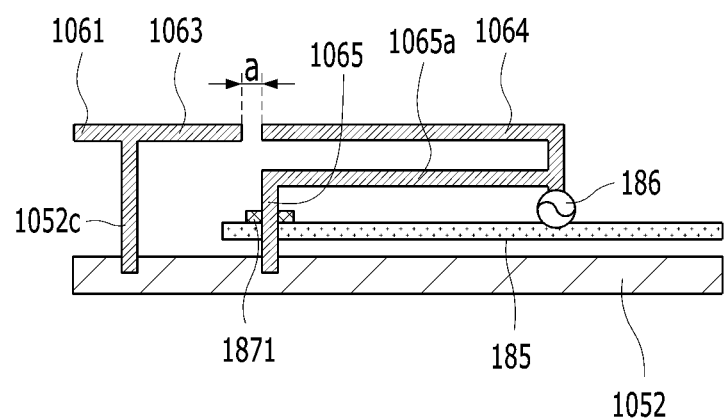
FIG. 11 is a sectional diagram of FIG. 9.
Figure 12:
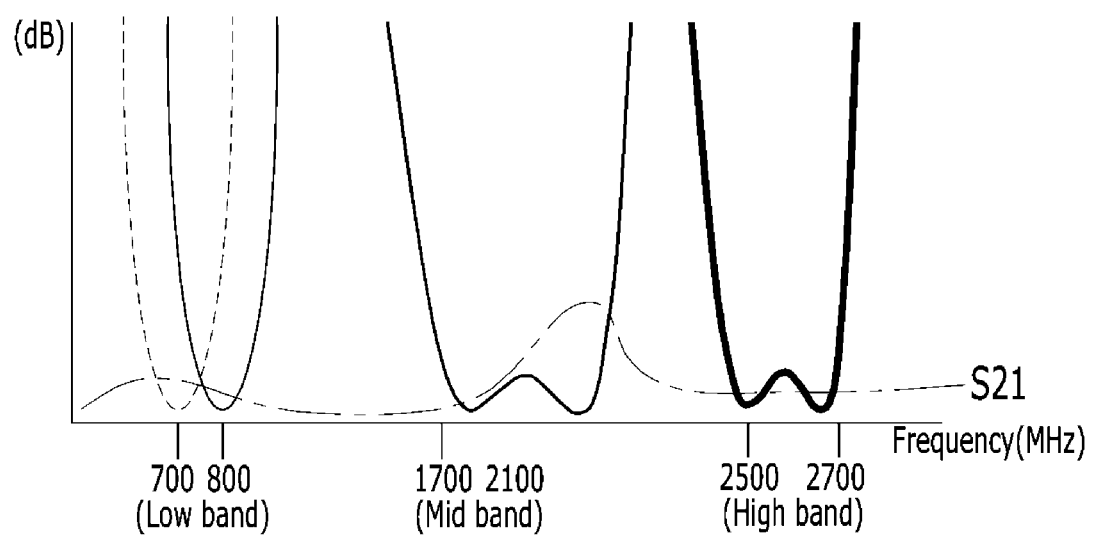
FIG. 12 is a graph illustrating efficiency of the antenna shown in FIG. 9.

FIG. 9 is a plane view illustrating one example of a first antenna 116 provided in the mobile terminal 100 in accordance with the present disclosure. FIG. 10 is a diagram illustrating another example of the first antenna 116 shown in FIG. 9. FIG. 11 is a sectional diagram of FIG. 9. FIG. 12 is a graph illustrating efficiency of the antenna shown in FIG. 9.

The frequency band of the signal transmitted and received by the first antenna 116 in the embodiment mentioned above is a low frequency band (700 MHz-960 MHz). The frequency band of the signal transmitted and received by the second antenna 117 is a middle frequency band (1.7 GHz-2.1 GHz). In several countries, a signal at a higher frequency band (2.6 GHz) is used for wireless communication. Accordingly, the configuration for transmitting and receiving a signal at a high frequency band is required.

A first feeder of this embodiment includes a delay line 1065*a* extended in a first direction. The first feeder 1065 of the embodiment mentioned above (see FIG. 4) is directly connected to the first conductive strip 1052. In contrast, the first feeder of this embodiment is connected to the first conductive strip 1052 at the position closer to the first direction than the connection unit of the embodiment mentioned above (see FIG. 4).

FIG. 10 is a diagram to describe an antenna in accordance with another embodiment of the present disclosure. As mentioned above, referring to FIGS. 3 (*a*) and (*b*), it is difficult to transmit a high frequency band signal, using the slot antenna having the length corresponding to the wavelength of the low frequency.

To generate the resonance effect at the high frequency band as well as the low frequency band, the first feeder 1065 of this embodiment may include a delay line 1065*a* extended to the first conductive strip 1052 impedance-matching the low frequency band and extended as far as a distance (d2) in an open direction of the slot (the first direction). The length of the delay line 1065*a* is two times or more the high frequency band wavelength of the signal resonating in the first antenna.

The impedance-matching corresponding to the high frequency band signal may be performed, using the delay line 1065*a*. The length of the delay line 1065*a* is adjusted so as to change the high frequency band in which the signal can be transmitted and received by the first antenna 116 (or the signal is resonating in the first antenna 116).

The first antenna 116 of this embodiment may further include two branch patterns 1063 and 1064 to transmit and receive the high frequency band signal. As shown in FIG. 11, one end of a first branch pattern 1063 is connected to the first conductive strip 1052 and the other end is extended from a different plane from the first conductive strip 1052. One end of a second branch pattern 1064 is connected to the power supply unit 186 of the main board 185 and the other end is extended from a different plane from the first conductive strip 1052.

The first branch pattern 1063 and the second branch pattern 1064 may be printed in or bonded to the back side of the rear case, so that they may be electrically apart from the first conductive strip 1052 by the rear case 102. The end of the first branch pattern 1063 may be connected with the first conductive strip 1052 via a screw 1052*c* penetrating the rear case 102 or a connection terminal formed in the rear case 102. As shown in FIG. 9, the first branch pattern 1065 may be connected with the first conductive strip 1052 through a path 1052*c* such as the first stub 1061.

Using the first branch pattern 1063 and the second branch pattern 1064, the high frequency band signal may be transmitted and received. When the length of the pattern is a quarter of the wavelength of the signal to transmit and receive, the signal is resonating in the corresponding frequency and the pattern may be used as the antenna.

In this instance, the point of the frequency at which the signal is resonating may be dispersed into two points to use a signal in a broad band (2.5 GHz-2.7 GHz). To resonate the signal at the two points, the second branch pattern 1064 may form a pattern having a length corresponding to a quarter of the wavelength of the first resonance frequency to match the first resonance frequency (2.5 GHz in this embodiment). The first branch pattern 1063 may form a pattern having a length corresponding to a quarter of the wavelength of the second resonance frequency to match the second resonance frequency (2.7 GHz in this embodiment). At this time, the length of the first branch pattern 1063 and the length of the second branch pattern 1064 may be vice versa.

The first feeder may be extended from the power supply unit 186 in the first direction to have the length corresponding to the quarter of the wavelength of the first resonance frequency for the impedance-matching with the high frequency band signal.

In the embodiment shown in FIG. 10, the first branch pattern 1063 is extended in a second direction (a right direction in the drawing) which is the reverse of the open direction of the first slot 1056, so that the other end of the first branch pattern 1063 and the other end of the second branch pattern 1064 may face each other.

The distance between the other end of the first branch pattern 1063 and the other end of the second branch pattern 1064 may be 5 mm or less. The two branch patterns 1063 and 1064 are further provided and the signal in the high frequency band (2.5 GHz-2.7 GHz) is resonating in the first antenna 116 as shown in FIG. 12.

As shown in FIGS. 9 and 11, a switch 1871 may be further provided and the switch 1871 may be connected to the first feeder 1065. The switch 1871 may be formed in the main board 185 and the first feeder 1065 connected to the power supply unit 186 may be connected to the first conductive strip 1052 via the switch 1871.

The electric currents applied to the first antenna 116 are changed according to On/Off of the switch 1871 to match a different frequency band. Referring to FIG. 12, two graphs are shown in a low frequency band. The resonance frequencies of the low frequency band are variable according to On/Off of the switch 1871.

S21 shown in FIG. 12 is a graph (S21) showing degrees of effect of the first antenna 116 and the second antenna 117 one each other, when the two antennas are operating simultaneously. The effect is increasing in the middle frequency band and there is a problem of interference when the first antenna 116 and the second antenna 117 are operating simultaneously. The structure of the first antenna 116 further including the first branch pattern 1063 and the second branch pattern 1064 in the embodiment shown in FIG. 9 may have an advantage that even the high frequency band signal can be used and a disadvantage of interference in the middle frequency band which is the resonance frequency band of the second antenna 117. Accordingly, the structure needs to be improved to minimize the interference between the first antenna 116 and the second antenna 117 in the countries not using the high frequency band signals.

Figure 13:
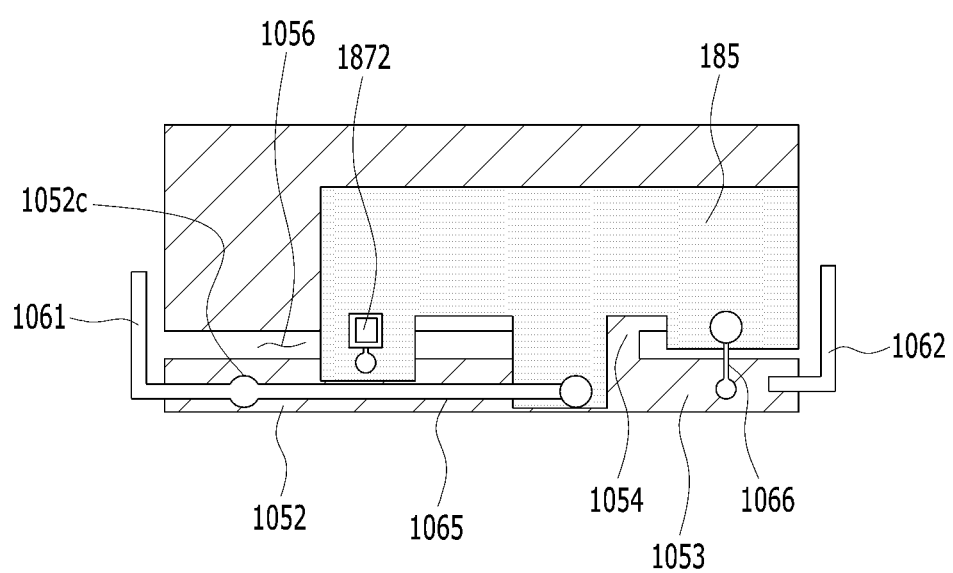
FIG. 13 is a plane view illustrating a further example of the first antenna provided in the mobile terminal in accordance with the present disclosure.
Figure 14:
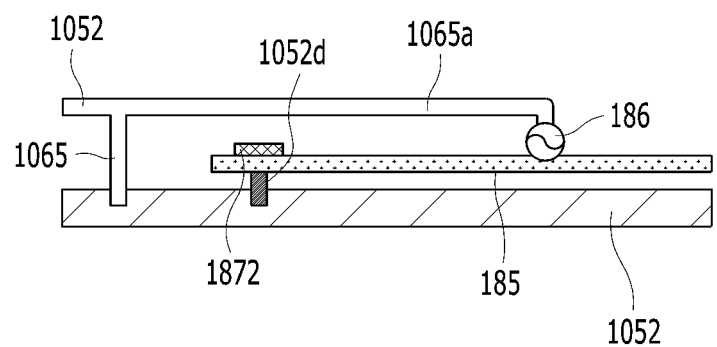
FIG. 14 is a sectional diagram of FIG. 13.
Figure 15:
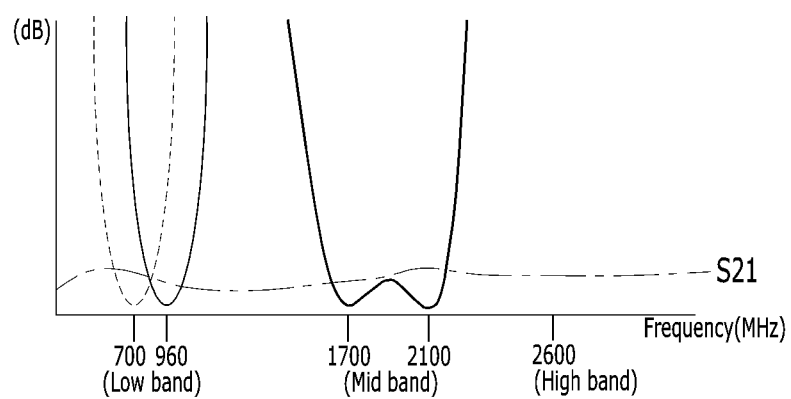
FIG. 15 is a graph illustrating efficiency of the antenna shown in FIG. 13.

FIG. 13 is a plane view illustrating a further example of the first antenna 116 provided in the mobile terminal in accordance with the present disclosure. FIG. 14 is a sectional diagram of FIG. 13. FIG. 15 is a graph illustrating efficiency of the antenna shown in FIG. 13.

In this embodiment, the first feeder 1065 arranged across the first slot 1056 is extended near the connection unit 1054 in a first direction along the first conductive strip 1052. One end of the extended first feeder 1065 is connected (1052c) to the first conductive strip 1052. As shown in FIG. 14, a switch 1872 is connected to the first conductive strip 1052 at the portion closer to the connection unit 1054 than the first feeder 1065.

The first antenna may be provided as a form of a loop antenna shown in FIG. 14 by the first conductive strip 1052 and the first feeder 1065. The loop antenna has directivity to form an electromagnetic field in a specific direction and it has relatively less effect on peripheral electronic devices. The first antenna which is such the loop antenna receives less inference from the second antenna 117 and transmits and receives signals stably.

Different from the embodiment mentioned above, referring to FIG. 9, the first antenna may not transmit and receive the high frequency band signal in this embodiment but may more stably transmit and receive the low frequency band signal and the middle frequency band signal in regions not performing communication, using the high frequency band signal.

In this embodiment, the first stub 1061 is connected to the first feeder 1065 and it directly receives the applied power to transmit and receive the signal.

Referring to FIG. 15, the graph of S21 showing the inference between the two antennas 16 and 117 has a relatively gentle curve. Accordingly, it can be checked that there is not much interference even when the first antenna 116 and the second antenna 117 are operating simultaneously.

Figure 16:
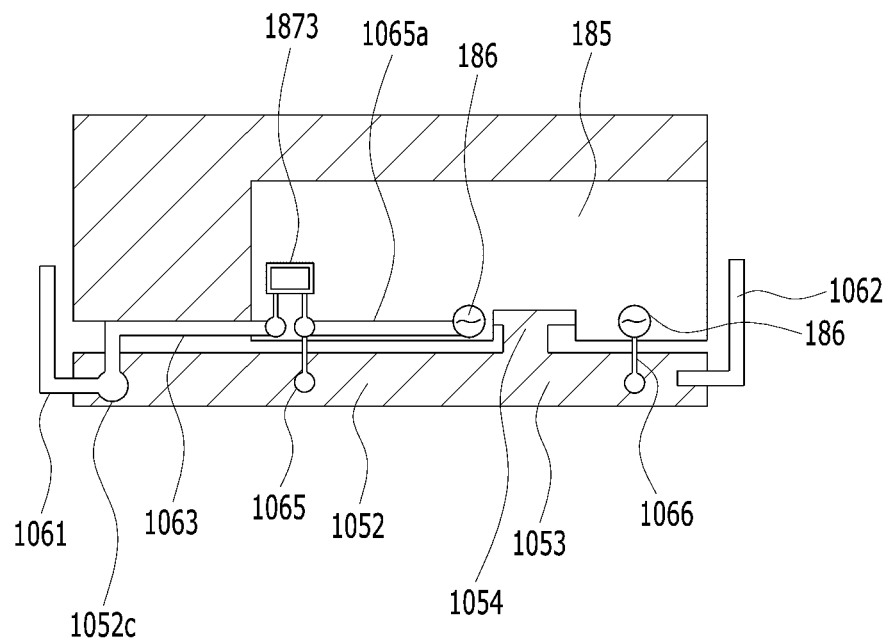
FIG. 16 is a plane view illustrating a still further example of the first antenna provided in the mobile terminal in accordance with the present disclosure.
Figure 17:
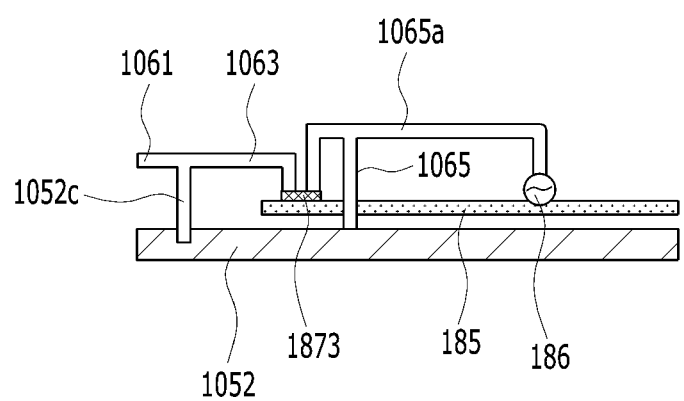
FIG. 17 is a sectional diagram of FIG. 16.

FIG. 16 is a plane view illustrating a still further example of the first antenna 116 provided in the mobile terminal 100 in accordance with the present disclosure. FIG. 17 is a sectional diagram of FIG. 16.

Using the switch 1871 shown in FIG. 9, the resonance frequency may be changed from a first frequency (e.g., 700 MHz) to a second frequency (e.g., 900 MHz) and vice versa. However, only a distance between short points in power supply is changed and antenna matching degradation is generated disadvantageously.

Figure 18:
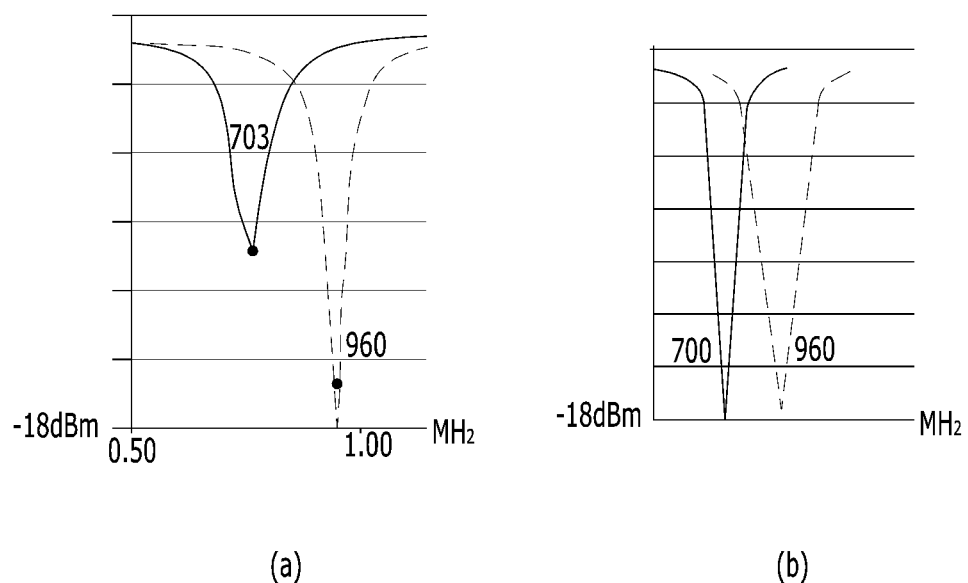
FIG. 18 is a graph illustrating signal strengths in a low frequency band.

As shown in FIG. 18 (a) which is a graph showing frequency characteristics in the impedance matching using the switch 1871 of FIG. 9, frequency characteristics are deteriorated when the resonance frequency is changed from the second frequency to the first frequency (the frequency characteristics are enhanced more as frequency dB is increased more).

When a switch 1873 connected to a first radiator 1052 to match a signal in the low frequency band with a signal in a different frequency band, resonance characteristics are changed and the performance of the frequency switching in the low frequency band in this embodiment. The switch 1873 of this embodiment changes a connection state between the first feeder 1065 and the first radiator 1052 and then changes the type of the antenna. In a state where the switch 1873 is switched off, the signal is resonating at a first frequency. In a state where the switch 1873 is switched on, the signal is resonating at a second frequency.

The first radiator may include the first conductive strip 1052 and also the first stub 1061 in this embodiment. The first branch 1063 is extended from the first radiator 1052. As mentioned above, the first branch pattern 1063 is coupled to the delay line in the high frequency band and configured to improve the frequency characteristics. In addition, the first branch pattern 1063 is configured to change the type of the antenna.

Figure 19:
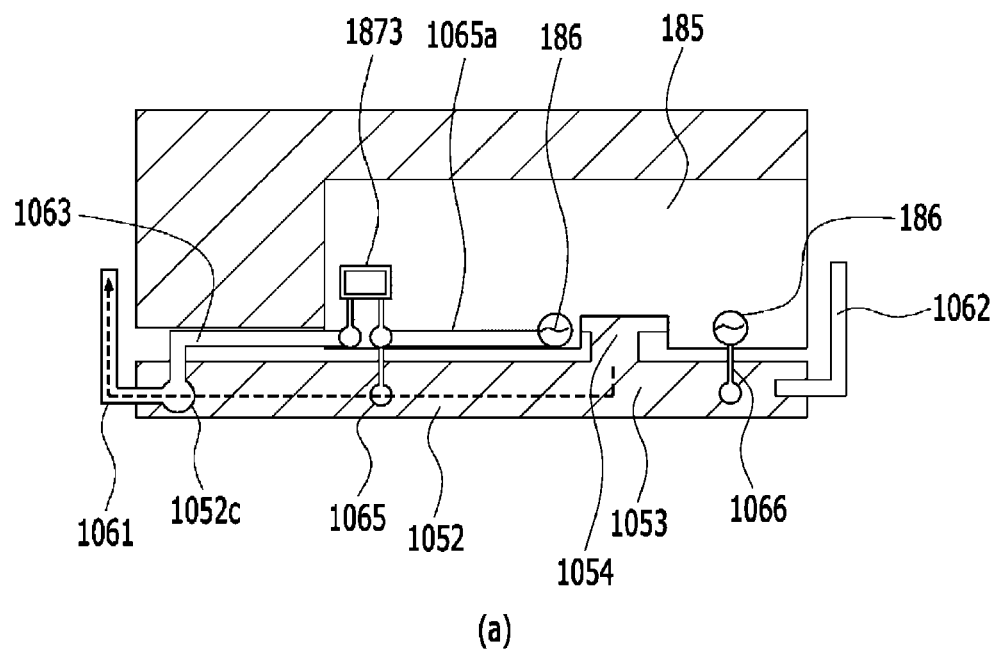
FIG. 19 is a diagram illustrating flow of currents in the antenna shown in FIG. 16.
Figure 19:
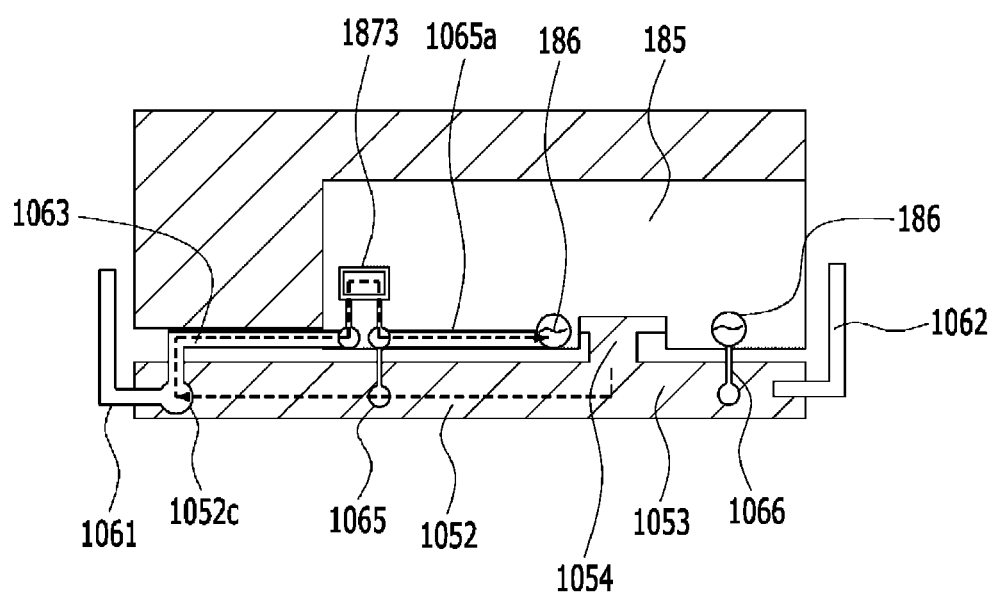

In the state where the switch 1873 is switched off, the first branch pattern 1063 is not connected to the first feeder 1065 and the first antenna is operating as the slot antenna or PIFA antenna mentioned above, so that the signal may resonate at the frequency (the first frequency) having the wavelength corresponding to the quadruple of the length of the first radiator 1052 in the first antenna. FIG. 19 (a) illustrates flow of currents when the switch 1873 is switched off. Electric currents are flowing along the first radiator 1052 from the connection unit (the grounded portion).

When the switch 1873 is switched on, the first branch pattern 1063 and the first feeder 1065 are connected to each other. In case the first feeder 1065 includes the delay line, the delay line is connected to the first branch pattern 1063 as shown in FIG. 16. FIG. 19 (b) illustrates current flow when the switch 1873 is switched on. The loop structure is formed from the connection unit (the grounded portion) to the feeder through the first conductive strip, the first branch pattern 1063, the switch 1873 and the delay line.

The frequency having the wavelength twice the length of the loop may be a resonance frequency (a second frequency). In other words, when the loop is formed by the switch 1873, the loop antenna becomes longer than the PIFA antenna mentioned above. The length of the loop antenna has to be a half of the wavelength of the resonance frequency so that the signal may resonate in a substantially shorter frequency than the resonance frequency.

FIG. 18 (b) is a graph illustrating signal strength in the structure connected from the delay line 1065a to the first conductive strip 1052 shown in FIG. 16. High efficiency is shown in 700 MFz and 960 MHz. The switch 1873 shown in FIG. 18 may not change a short point of the first antenna 116 but the length and structure of the first antenna to change the current flow and the antenna type. Accordingly, the matching is performed in a frequency band of 700 MHz, without deterioration.

Figure 20:
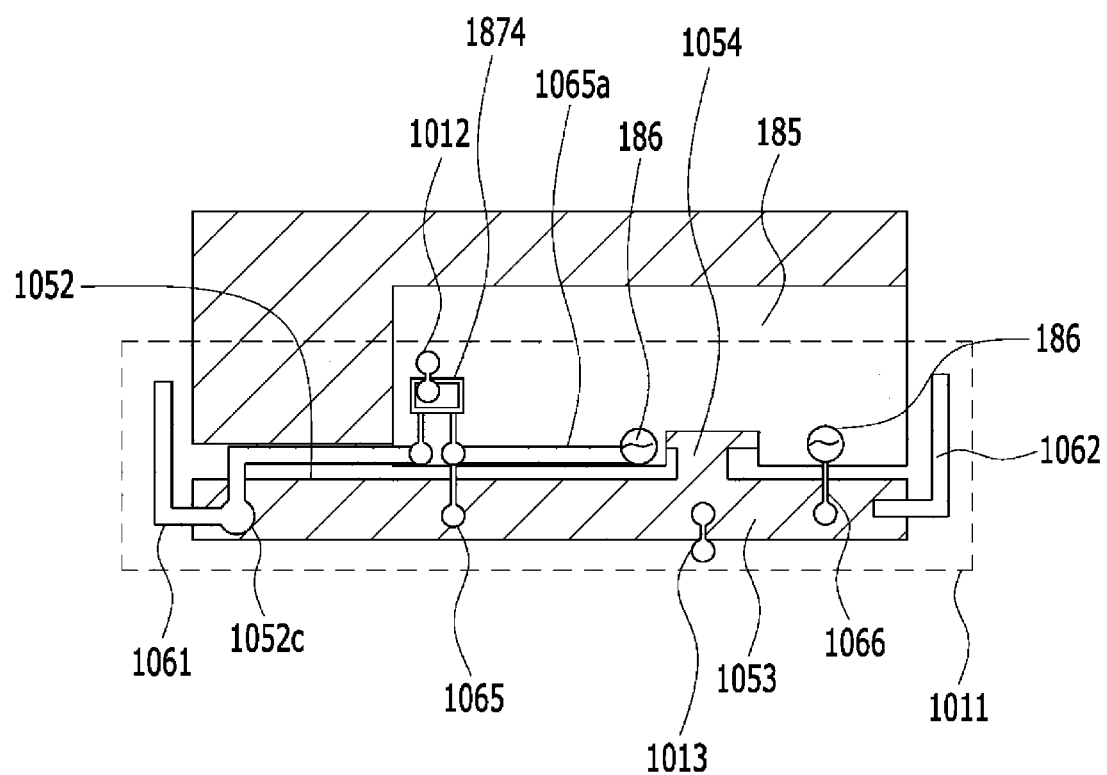
FIG. 20 is a diagram illustrating a modified example of the embodiment shown in FIG. 16.

FIG. 20 is a diagram illustrating a modified example of the embodiment shown in FIG. 16. The switch 1873 is switched on and off to selectively connect the first radiator 1052 and a third radiator 1011 with each other. The first radiator 1052 and the third radiator 1011 are arranged in different positions, spaced apart a preset distance from each other. When the first radiator 1052 fails to perform the function, the switch 1874 is switched on to connect the third radiator 1011 and the first feeder 1065 to each other and wireless communication can be performed, using the third radiator 1011.

For example, when the user holds the mobile terminal 100 including an electric conductor with the first radiator 1052 and the second radiator 1053 exposed to a lateral surface of the mobile terminal 100 and the third radiator 1011 exposed to a front surface of the mobile terminal 100, the user's hand touches the first radiator 1052 and the second radiator 1053 exposed to the lateral surface. Accordingly, the flow of the currents flowing in the first antenna is changed and speech quality could be deteriorated disadvantageously. In this instance, the switch 1874 is connected to the third radiator 1011 exposed to the front surface and the radiator of the antenna is then changed.

At this time, an additional switch may be further provided and configured to selectively connect the first radiator 1052 and the first feeder 1065 to each other. When the third radiator 1011 and the first feeder 1065 are connected to each other after the switch 1874 is switched on, the additional switch is switched off and the connection between the first radiator 1052 and the first feeder 1065 is cut off. Hence, currents are not flowing in the first radiator 1052 and power consumption is then decreased.

Figure 21:
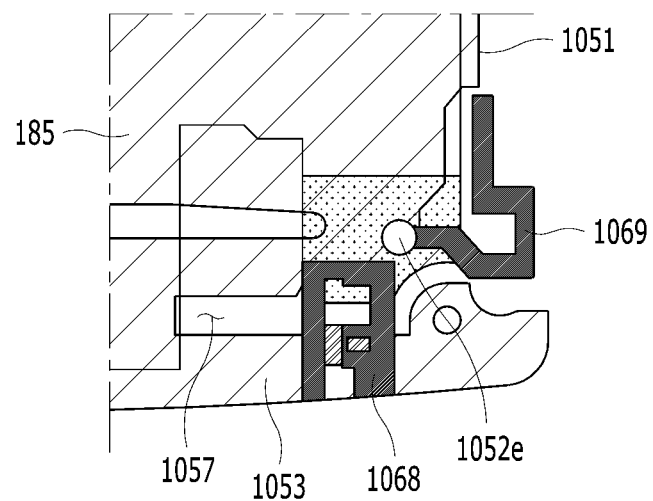
FIG. 21 is a plane view illustrating one example of a second antenna provided in the mobile terminal in accordance with the present disclosure.
Figure 22:
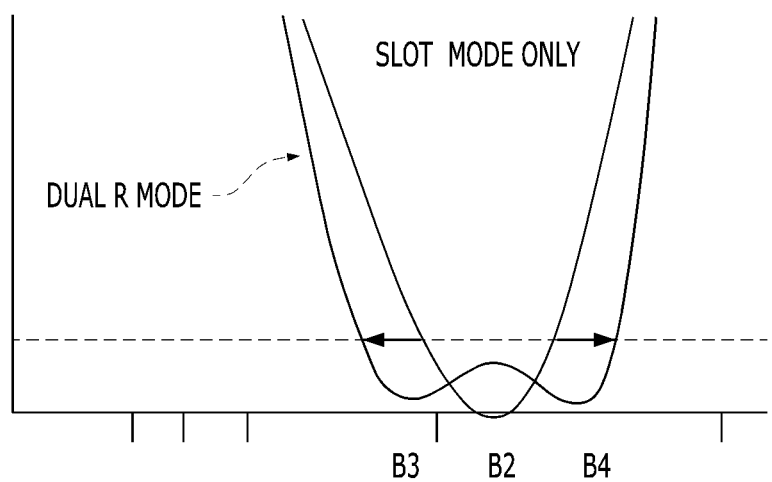
FIG. 22 is a graph illustrating efficiency of the antenna shown in FIG. 21.

FIG. 21 is a plane view illustrating one example of a second antenna 117 provided in the mobile terminal 100 in accordance with the present disclosure. FIG. 22 is a graph illustrating efficiency of the antenna shown in FIG. 21.

The second antenna 117 is shorter than the first antenna 116 and used in transmitting and receiving a signal in frequencies near 200 Hz. If the signal is transmitted and received, only using the second slot 1057, there is only one optimal point of the points (1.9 GHz) shown in the graph of FIG. 22 and the frequency band located under a horizontal dotted line (i.e., a valid signal strength) is substantially narrow. To use diversified communication methods, it is necessary to broaden the frequency band which can be used by the second antenna 117.

One end of a third branch pattern 1068 is connected to the second conductive strip 1053 of the second antenna 117. The third branch pattern 1068 is extended to be spaced apart a preset distance from the second conductive strip 1053 and the metal frame. Such the third branch pattern 1068 may be formed in the rear surface of the rear case and one end of the third branch pattern 1068 is arranged in the rear case 102 via a hole formed in the rear case, to connectedly contact with the second conductive strip 1053.

One end 1052e of a fourth branch pattern 1069 is connected to the main board 185 arranged adjacent to the second antenna 117 and the fourth branch pattern 1069 receives the power from the power supply unit through the main board 185. The fourth branch pattern 1069 is spaced apart a preset distance from the second conductive strip 1053 and it may be also formed in the rear surface of the rear case 102.

The third branch pattern 1068 and the fourth branch pattern 1069 may have the lengths corresponding to a quarter of the wavelength of the frequency band for resonance to change the range of the middle frequency band, respectively. The length of the third branch pattern 1068 may be a quarter of the wavelength of a first resonance frequency (1.7 GHz in this embodiment). The length of the fourth branch pattern 1069 may be a quarter of the wavelength of a second resonance frequency (2.1 GHz in this embodiment).

In this embodiment, the second feeder 1066 extended from the main board 185 is not directly connected to the second conductive strip 1053. However, when currents flow in the fourth branch pattern 1069, a magnetic field is formed and the second antenna can transmit and receive a signal.

When the third branch pattern 1068 and the fourth branch pattern 1069 are further provided, there may be an effect of the broadened middle frequency band shown in FIG. 16 and signals in a range of 1700 MHz-2100 MHz may be used accordingly.

According to at least one of the embodiments mentioned above, the interference of the metallic material provided in the mobile terminal 100 in the antenna may be minimized and the performance of the antenna may be improved.

Moreover, a metallic material may be used in forming an outer side of the mobile terminal and there is little restriction of exterior design. Accordingly, the design quality may be developed. The antenna space is not restricted by the external terminal connection unit 1054 including the ear jack 162 and the USB port 161 and component arrangement freedom may be improved.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a case having a front side;
a display at the front side;
a first antenna mounted in the case and comprising a first slot extending in a first direction, the first slot having a closed end and an open end;
a second antenna mounted in the case and comprising a second slot extending in a second direction opposite to the extended first direction of the first slot, the second slot comprising a closed end and an open end;
a power supply mounted in the case;
a first feeder supplying the power of the power supply to the first antenna;
a second feeder supplying the power of the power supply to the second antenna;
a metal plate mounted in the case;
a connection portion extending from one side of the metal plate;
a first conductive strip extending from the connection portion in the first direction, the first conductive strip being separated from the metal plate by a prescribed space; and
a second conductive strip extending from the connection portion in the second direction opposite to the first conductive strip, the second conductive strip being separated from the metal plate by a prescribed space,
wherein the first slot is defined by the first conductive strip, the connection portion and the metal plate, and the second slot is defined by the second conductive strip, the connection portion and the metal plate.

2. The mobile terminal of claim 1, wherein the first slot is longer than the second slot.

3. The mobile terminal of claim 1, further comprising:
a main board provided in a rear surface of the metal plate; and
an external terminal connector coupled to a rear surface of the main board,
wherein at least one of the first and second conductive strips is provided in a direction toward the external terminal connector.

4. The mobile terminal of claim 1, further comprising a stub connectedly extended from an end of at least of one of the first and second conductive strips opposite from the connection portion.

5. The mobile terminal of claim 1, wherein the case comprises:
a front case covering the front surface; and
a rear cover covering the rear surface, and
wherein the stub is formed in a rear surface of the rear case and is connected to at least one of the first and second conductive strips through the rear case.

6. The mobile terminal of claim 5, wherein the first conductive strip and the second conductive strip are provided in an upper or lower portion of the case, and
the stub is vertically extended along a lateral surface of the case.

7. The mobile terminal of claim 1, wherein the first feeder comprises a delay line extending along the first conductive strip, the first feeder being connected to the first conductive strip at one end of the delay line.

8. The mobile terminal of claim 1, further comprising:
a first branch pattern having one end connected to the first conductive strip and the other end extended in the second direction; and
a second branch pattern provided adjacent to the first antenna, the second branch pattern having one end connected to the power supply and the other end extended in the first direction,
wherein the other end of the first branch pattern and the other end of the second branch pattern are arranged nearby to face each other.

9. The mobile terminal of claim 1, further comprising:
a third branch pattern extending from the second conductive strip; and
a fourth branch pattern provided adjacent to the second antenna and having one end connected to the power supply.

* * * * *